United States Patent
Waki et al.

(10) Patent No.: US 6,468,620 B2
(45) Date of Patent: Oct. 22, 2002

(54) OPTICAL RECORDING MEDIUM AND OPTICAL RECORDING METHOD

(75) Inventors: Koukichi Waki, Kanagawa (JP); Yoshihisa Usami, Kanagawa (JP); Shingo Ishimaru, Tokyo (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 44 days.

(21) Appl. No.: 09/810,223

(22) Filed: Mar. 19, 2001

(65) Prior Publication Data

US 2001/0022769 A1 Sep. 20, 2001

(30) Foreign Application Priority Data

| | | |
|---|---|---|
| Mar. 17, 2000 | (JP) | 2000-075472 |
| Jun. 19, 2000 | (JP) | 2000-183142 |
| Dec. 20, 2000 | (JP) | 2000-387259 |

(51) Int. Cl.$^7$ ................................................ B32B 3/02
(52) U.S. Cl. ........................................ 428/64.1; 428/402
(58) Field of Search .......................... 428/64.1, 64.4, 428/64.8, 402, 403, 913; 430/270.11, 495.1, 945; 369/283, 288

(56) References Cited

U.S. PATENT DOCUMENTS

| | | | |
|---|---|---|---|
| 4,762,770 A | | 8/1988 | Bouldin et al. .............. 430/273 |
| 4,788,129 A | | 11/1988 | Bouldin et al. .............. 430/273 |
| 5,889,756 A | * | 3/1999 | Ic hihara ................. 369/275.2 |
| 6,187,406 B1 | * | 2/2001 | Ichihara ..................... 428/64.1 |
| 6,339,582 B1 | * | 1/2002 | Ichihara ................... 369/275.2 |

FOREIGN PATENT DOCUMENTS

| | | | |
|---|---|---|---|
| WO | 88/08120 | 10/1988 | .......... G01D/15/10 |

* cited by examiner

Primary Examiner—Elizabeth Mulvaney
(74) Attorney, Agent, or Firm—Sughrue Mion, PLLC

(57) ABSTRACT

An optical recording medium comprising a recording layer containing ultrafine particles of a metal selected from the Group 8 and Group 1B elements, said particles having an average particle size of 1 nm to 50 nm, and surfaces thereof being modified with an adsorptive compound.

16 Claims, 1 Drawing Sheet

OPTICAL RECORDING MEDIUM AND OPTICAL RECORDING METHOD

FIELD OF THE INVENTION

The present invention relates to an optical recording medium, and further to an optical recording method.

BACKGROUND OF THE INVENTION

In optical recording materials, it is well known that a reduction in the wavelength of light to one nth results in an n×n-fold increase in the recording density of information. Accordingly, the development of short-wave lasers having a wavelength of about 400 nm has been gone ahead with, and the practical use thereof has just started. Conventionally, laser beams having a wavelength of 780 nm to 830 nm have been used, and recording media have also been developed and designed so as to exhibit the optimum performance within this wavelength region. However, with a decrease in the wavelength, light absorption ability, light reflection ability and information capacity required for the media also change.

Optical recording media represented by optical disks are classified into three types: (a) media in which only reading is possible (replay only type), (b) media in which writing is once possible (write once type) and (c) rewritable media (rewrite type), according to the respective characteristics thereof. Of these, the invention relates to the write once-type optical recording media of (b). The write once-type optical recording media are utilized as outboard recorders for electronic computers, and also used for recording music, images and works.

The conventional write once-type optical recording media can be roughly classified into the following five types:

(1) Media in which using thin films of tellurium-containing low-melting alloys, thin films of other metals or alloys thereof, or thin films of organic compounds including cyanine dyes, the recording films are locally evaporated by laser beam irradiation, or the recording films melted are pulled by surface tension, thereby forming pits (pitting type);

(2) Media in which amorphous films such as a tellurium oxide film are locally melted by laser beam irradiation, followed by rapid quenching to induce crystallization, thereby forming pits, and the difference in reflectance between the amorphous and crystalline films is utilized for reading (phase change type);

(3) Media in which metal films each comprising two layers comprising raw materials different from each other are melted by laser beam irradiation to locally alloy them (alloy type);

(4) Media in which bubbles are developed between layers by heat caused by laser beam irradiation to form pits (bubble forming type); and (5) Media in which fine relief structure surface are formed, which are melt smoothed by heat caused by laser beam irradiation to increase the reflectance (metal oxide semiconductor (MOS) type).

The write once-type optical recording materials of (1) to (5) each have the following problems:

Of the pitting type recording media of (1), ones using the low-melting metals have the problem that errors are liable to occur because edge portions rise to provide the poor shape of pits written, in addition to the problems of keeping quality and toxicity. Further, ones using the organic films tend to deteriorate in their characteristics by ultraviolet rays. The phase change type disks of (2) have small changes in reflectance and are small in the size of signals, so that expensive apparatus are required for reading. For all of the alloy type disks of (3), the bubble forming type disks of (4) and the MOS type disks of (5), the optical recording media have multilayer structures in principle, leading to complicated structures of the disks. Further, many have small changes in reflectance and low writing speed.

Several methods using metals are disclosed, and physical methods such as vapor deposition and spattering and chemical methods such as spin coating of colloidal dispersions of metals are disclosed.

Materials for the recording media in which the thin films are formed by the physical methods using the metals are disclosed as below. Japanese Patent No. 1739116 discloses recording layers in which metals or semi-metals and organic polymers exist as mixtures, and shows a vapor-deposited layer of aluminum and bismuth. JP-A-57-94944 (the term "JP-A" as used herein means an "unexamined published Japanese patent application") discloses thin films of fine particles of metals, alloys, semiconductors or inorganic materials, and exemplifies 20-nm FeNi (9:1), 25-nm Bi, 10-nm Ag, 30-nm Si and 30-nm carbon. JP-A-61-104438 discloses a structure in which fine metal particles are dispersed in organic matrices. In the case of Ag particles, the particle size thereof is 10 nm, and in the case of Au particles, the particle size thereof is 28 nm. JP-A-61-95991 discloses recording layers formed by vapor deposition in which metal or alloy particles having an average particle size of 4 nm to 40 nm are three-dimensionally arranged and the porosity is specified, and exemplifies Ag particles having a particle size of 10 nm and Au particles having a particle size of 15 nm. JP-A62-151394 discloses thin films in which ultrafine particles having a particle size of 100 nm or less are dispersed in organic compounds, and exemplifies titanium black having a particle size of 50 nm. JP-A-63-262286 discloses resin films in which metal particles having a particle size of 10 nm or less are contained, and exemplifies Au particles. JP-A-1-78885 discloses films in which Au and other metals exist as a separated phase without forming alloys. JP-A-7-76171 discloses recording layers comprising Ag or Al particles and alloys containing them, which are discretely distributed and have a size of 100 nm or less, on the condition that lasers having a wavelength of 600 nm or less are used.

The films of the metals or the alloys thereof formed by these physical methods are studied on the condition that the laser beam of 830 nm or 780 nm, which is not a blue laser, is used except for JP-A-7-76171. Accordingly, they are unsuitable for the object of the invention. Although the recording layers described in JP-A-7-76171 are based on the condition that a blue laser is used, the thin films are formed by spattering. It is therefore difficult to control a particle size distribution, and they are not advisable in terms of practical use of light absorption by the original plasmon resonance of metal particles. In fact, in a thin film having a thickness as thin as 1 nm to 2 nm prepared by spattering, an absorption peak was observed in the vicinity of 500 nm, but it was very difficult to obtain a sufficient absorption at less than 500 nm, as shown in FIG. 1. A mere increase in thickness results in exclusively increased absorption in a long-wave region of more than 500 nm. As a result, it was very difficult to improve the recording sensitivity by such physical methods.

Materials for the recording media in which the thin films are formed by the chemical methods using the metals are disclosed as below. JP-A-56-10491 discloses a method of dispersing fine particles of transition metals other than the Group 2B metals or oxides thereof having a particle size of 2 nm to 15 nm in polymers to prepare colloidal dispersions, and forming thin films, and exemplifies Fe and Co particles having a particle size of several nanometers. JP-A-58-53036 discloses a method of dispersing metallic silver by the reducing method or the developing method to prepare colloidal dispersions, and forming thin films. Japanese Patent No. 2686984 discloses a method of utilizing metallic silver-dispersed layers produced by organic silver salt oxidizing agents and reducing agents. JP-A-4-105986 discloses a method of laminating layers containing at least one kind of metal element, wherein one of the metal elements is Pd having a particle size of 5 nm to 50 nm. Of course, these are not studied on the condition that a blue laser is used, so that these are unsuitable for the object of the invention. Further, the methods described in JP-A-58-53036 and Japanese Patent No. 2686984 are complicated in production processes, and therefore, can not be put to practical use.

SUMMARY OF THE INVENTION

In view of the above-mentioned circumstances, an object of the invention is to provide a write once-type optical recording medium high in sensitivity and excellent in information keeping quality in a short-wave region in which high recording density can be expected.

Another object of the invention is to provide a recording method thereof.

Other objects and effects of the present invention will become apparent from the following description.

The above-mentioned objects can be attained by an optical recording medium comprising a recording layer containing ultrafine particles of a metal selected from the Group 8 and Group 1B elements, the particles having an average particle size of 1 nm to 50 nm, and surfaces thereof being modified with an adsorptive compound, and by making a recording and replay thereon with a short-wave laser beam having a wavelength of 500 nm or less. Preferred embodiments are described below:

(1) An optical recording medium comprising a recording layer containing ultrafine particles of a metal selected from the Group 8 and Group 1B elements, said particles having an average particle size of 1 nm to 50 nm, and surfaces thereof being modified with an adsorptive compound.

(2) The optical recording medium according to item (1) above, wherein said adsorptive compound is a compound having an —SH group, a —CN group or an —NH$_2$ group.

(3) The optical recording medium according to item (1) or (2) above, wherein said metal is a platinum group element or an alloy thereof.

(4) The optical recording medium according to any one of items (1) to (3) above, wherein each of said ultrafine particles comprises an inner shell and at least one outer shell.

(5) The optical recording medium according to item (4) above, wherein a metal of said outer shell has a nobler potential than a metal of said inner shell.

(6) The optical recording medium according to item (4) or (5) above, wherein said inner shell comprises silver or a silver-containing alloy, and said outer shell comprises a metal having a nobler potential than silver or the alloy containing the metal;

(7) The optical recording medium according to any one of items (1) to (6) above, wherein said ultrafine particles have a monodisperse particle size distribution.

(8) The optical recording medium according to any one of items (1) to (7) above, wherein said recording layer contains a binder.

(9) The optical recording medium according to item (8) above, wherein said recording layer contains a silicone rubber or a polybutadiene rubber.

(10) The optical recording medium according to any one of items (1) to (9) above, wherein the recording layer is formed by applying a colloidal dispersion of said ultrafine particles in a hydrophilic or hydrophobic solvent.

(11) The optical recording medium according to any one of items (1) to (10) above, wherein said recording layer has a thickness of 3 nm to 180 nm.

(12) The optical recording medium according to any one of items (1) to (11) above, further comprising a substrate, a reflective layer and a protective layer, wherein the recording layer, the reflective layer and the protective layer are provided on the substrate in this order.

(13) The optical recording medium according to any one of items (1) to (11) above, further comprising a substrate, a heat insulating layer, a reflective layer and a protective layer, wherein the recording layer, the heat insulating layer, the reflective layer and the protective layer are provided on the substrate in this order.

(14) The optical recording medium according to item (13) above, wherein said heat insulating layer comprises an amorphous fluororesin.

(15) The optical recording medium according to any one of items (1) to (14) above, wherein said recording layer or said heat insulating layer contains an organic dye.

(16) An optical recording method which comprises carrying out recording on an optical recording medium according to any one of items (1) to (15) above using a laser having an oscillating wavelength ranging from 300 nm to 500 nm.

DETAILED DESCRIPTION OF THE INVENTION

Figure 1:
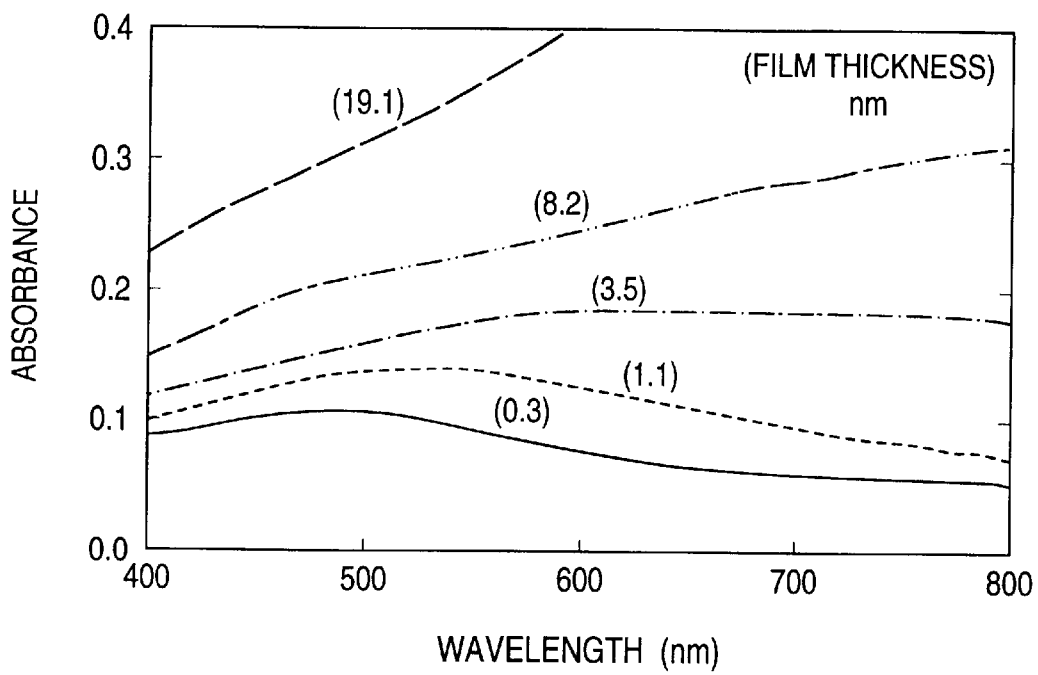
FIG. 1 shows absorption spectra of silver films obtained by conventional spattering.

Although the invention belongs to the system of (1) described above, it becomes possible to produce the optical recording medium high in sensitivity and excellent in keeping quality at low cost by making the particle structure and the surface state of a metal entirely different from those of conventional materials for media. The invention intends to achieve the high sensitivity and to increase the information recording/replay density by forming a thin film provided with light absorption ability due to plasmon resonance of an ultrafine metal particle colloid, and to enhance the acid resistance and to realize low cost by developing a novel particle structure. These have been attained by the optical recording medium having a recording layer formed by applying ultrafine particles of a metal selected from the Group 8 and Group 1B elements, the particles being dispersible in a hydrophilic or hydrophobic solvent in a colloidal state and having an average particle size of 1 nm to 50 nm, and surfaces thereof being modified with an adsorptive compound. It is further preferred that the adsorptive compound with which the surfaces of the ultrafine particles are modified is a compound containing a mercapto group (—SH group), that the metal is a platinum group element or an alloy thereof, that each of the ultrafine particles comprises an inner shell and at least one outer shell, that the inner shell comprises silver, and the outer shell comprises a metal having a nobler potential than silver, or an alloy thereof, that the inner shell comprises silver, and the outer shell comprises palladium or a palladium-containing alloy, that the ultrafine particles have a monodisperse particle size distribution, that the recording layer has a thickness of 3 nm to 180 nm (preferably 10 nm to 100 nm), that the recording layer, a reflective layer and a protective layer are provided on a substrate in this order, that the recording layer, a heat insulating layer, a reflective layer and a protective layer are provided on a substrate in this order, that the recording layer contains silicone rubber or polybutadiene rubber, that the recording layer or the heat insulating layer contains an organic dye, and that the heat insulating layer comprises a fluororesin.

The metal used in the invention is a metal selected from the Group 8 and Group 1B elements or an alloy thereof. The alloy may have either a homogeneous structure or an inner shell/outer shell structure.

Although the ultrafine metal particles have selective light absorption caused by plasmon resonance, the absorption region is widened by optical scattering in an aggregated state to come closer to gray or black, and the absorption of the selective absorption wavelength region is decreased. Accordingly, for attaining the objects of the invention, that is to say, for making a recording with a short-wave light beam such as a blue laser beam at good sensitivity and high modulation degree, it becomes important that the ultrafine particles are densely arranged to a degree that the characteristics of the particles can be exhibited. The present inventors have discovered that modification with a compound having a group adsorptive to surfaces of the metal particles is important for this purpose. As modifiers, there are effectively used —SH group, —CN group and —NH$_2$ group-containing compounds and citric acid. Of these, most preferred are —SH group-containing compounds, and compounds represented by R—SH are preferred. R is an aliphatic group, an aromatic group or a heterocyclic group.

As the aliphatic group, preferred is an alkyl group (preferably, a straight-chain or branched alkyl group, which may have a substituent group, having from 1 to 30 carbon atoms, more preferably from 1 to 20 carbon atoms). Preferred examples thereof include alkanethiols (for example, octanethiol, decanethiol, dodecanethiol, 1,6-hexanethiol, 2-mercaptoethanol and 1H,1H,2H,2H-perfluorodecanethiol) and sulfonic acid group- or carboxylic acid group-containing alkanethiols (for example, sodium 3-mercapto-1-propanesulfonate, sodium 5-mercapto-1pentanesulfonate and sodium 5-mercapto-1-pentane-carboxylate).

As the aromatic group, preferred is a substituted or unsubstituted phenyl group (for example, thiophenol or thiocresol) or a substituted or unsubstituted naphthyl group (for example, thionaphthol).

As the heterocyclic group, preferred is thiophene, thiazole, thiadiazole, thioguanine, mercaptotetrazole or mercaptotriazole, which may be substituted.

As methods for preparing ultrafine particle dispersions used in the invention, there are known a method of reducing metal compounds or complex salts using polymers such as polyvinyl alcohol, polyvinylpyrrolidone and gelatin as dispersion media, a method of reducing metal compounds or complex salts in micelles using surfactants, and a method of reducing metal compounds or complex salts in reversed micelles using surfactants in systems in which aqueous phases and organic phases exist. Of these methods, the reversed micelle method is preferred. According to the reversed method, the ultrafine particles can be easily transferred to the organic phases by addition of —SH group-containing compounds, and organic solvent dispersions for spinner coating can be easily prepared.

The average particle size of the ultrafine metal particles used in the invention is from 1 nm to 50 nm, preferably from 1 nm to 20 nm, more preferably from 1 nm to 10 nm, and most preferably from 1 nm to 4 nm. A size of more than 50 nm results in deterioration of recording characteristics. So-called monodisperse particles, which have a narrow particle size distribution, are better in differentiation between a recording portion and a non-recording portion. The monodisperse particles called in the invention have a coefficient of variation of preferably 30% or less, more preferably 20% or less, most preferably 10% or less.

In the invention, it is preferred that the substrate, the recording layer, the reflective layer and the protective layer are provided in this order. More preferably, a heat insulating layer is provided between the recording layer and the reflective layer. Further, an intermediate layer may be provided between the substrate and the recording layer, between the recording layer and the heat insulating layer, between the heat insulating layer and the reflective layer, or between the reflective layer and the protective layer. Furthermore, the recording layer may be formed of a plurality of layers.

It is preferred that the recording layer contains a binder. Examples of the binders include natural polymers such as gelatin, cellulose derivatives, dextran, rosin and rubber; and synthetic organic polymers such as hydrocarbon resins such as polyurethanes, polyethylene, polypropylene, polystyrene and polyisobutylene, vinyl resins such as polyvinyl chloride, polyvinylidene chloride and polyvinyl chloride-polymethyl methacrylate copolymers, polyvinyl alcohol, chlorinated polyethylene, epoxy resins, butyral resins, silicone rubber, polybutadiene rubber and phenolformaldehyde resins. Of these, particularly preferred are silicone rubber and polybutadiene rubber. The amount of the binder used is from 0.2 part to 30 parts by weight, preferably from 0.2 part to 20 parts by weight, and more preferably from 0.2 part to 10 parts by weight, based on 100 parts by weight of the ultrafine metal particles. The concentration of the ultrafine metal particles contained in the coating solution thus prepared is generally within the range of 0.01% to 10% by weight, and preferably within the range of 0.1% to 5% by weight.

The heat insulating layer used in the invention is provided for preventing heat of a laser beam with which the recording layer is irradiated from escaping to the metal reflective layer, thereby avoiding failure to form pits. Accordingly, a material showing an insulating effect is used therefor. The materials for the heat insulating layer include oxides such as $SiO_2$, $TiO_2$ and $Ag_2O$, the above-mentioned binders for the recording layer and amorphous fluororesins. Of these, particularly preferred are the amorphous fluororesins. Examples of the amorphous fluororesins include Cytop (trade name, manufactured by Asahi Glass Co., Ltd.) and Teflon AF (trade name, manufactured by du Pont).

The recording layer and the heat insulating layer used in the invention can contain a conventional organic dye for recording. The organic dye can be decomposed by the transfer of heat absorbed by the recording layer of the ultrafine metal particles to increase a change in reflectance, thereby providing an optical desk having high modulation degree.

Examples of the organic dyes include cyanine dyes, phthalocyanine dyes and azo metal complex dyes.

Methods for producing the optical recording media of the invention will be described below.

Materials for the substrates (including protective substrates) can be arbitrarily selected from various materials used for substrates of conventional optical recording media. The materials for the substrates include, for example, glass, polycarbonates, acrylic resins such as polymethyl methacrylate, vinyl chloride resins such as polyvinyl chloride and vinyl chloride copolymers, epoxy resins, amorphous polyolefins, polyesters and metals. They may be used in combination as desired. These materials can be used as films or rigid substrates. Of the above-mentioned materials, the polycarbonates are preferred in terms of moisture resistance, dimensional stability and cost. The substrates generally used have a diameter of 120±3 mm and a thickness of 0.6±0.1 mm, 1.1±0.1 mm or 1.2±0.1 mm, or a diameter of 80±3 mm and a thickness of 0.6±0.1 mm, 1.1±0.1 mm or 1.2±0.1 mm.

The optical recording media of the invention are used for CD-Rs and DVD-Rs. For achieving higher recording density, it is possible to use substrates on which pregrooves are formed at a narrower track pitch. In such a case, the track pitch of the substrates is preferably from 0.2 $\mu$m to 0.8 $\mu$m, and more preferably from 0.2 $\mu$m to 0.5 $\mu$m.

A surface of the substrate on which the recording layer of the ultrafine metal particles is formed may be provided with an undercoat layer, for improving surface properties, enhancing adhesion and preventing changes in the properties of the recording layer. Materials for the undercoat layer include, for example, polymers such as polymethyl methacrylate, acrylic acid-methacrylic acid copolymers, styrene-maleic anhydride copolymers, polyvinyl alcohol, N-methylolacrylamide, styrene-vinyltoluene copolymers, chlorosulfonated polyethylene, nitrocellulose, polyvinyl chloride, chlorinated polyolefins, polyesters, polyimides, vinyl acetate-vinyl chloride copolymers, ethylene-vinyl acetate copolymers, polyethylene, polypropylene and polycarbonates; and surface modifiers such as silane coupling agents. The undercoat layer can be formed by dissolving or dispersing the above-mentioned material in an appropriate solvent to prepare a coating solution, and then applying the coating solution onto the surface of the substrate by a coating method such as spin coating, dip coating or extrusion coating. The thickness of the undercoat layer is generally within the range of 0.005 $\mu$m to 20 $\mu$m, and preferably within the range of 0.01 $\mu$m to 10 $\mu$m.

On the substrate (or the undercoat layer), grooves (pregrooves) may be formed. The pregrooves can be formed by using a stamper (die) for resin molding previously processed so as to have sidewalls with a specified tilt angle, when the substrate is formed by injection molding or extrusion molding. For example, such a stamper can be obtained by adjusting the irradiation conditions (optical adjustment, irradiation power) of a laser beam for processing, thereby processing the stamper so as to give a desired shape, in the production process of the stamper.

The grooves may be formed by providing a pregroove layer. As materials for the pregroove layer, there can be used mixtures of photopolymerization initiators and at least one monomer (or oligomer) of monoesters, diesters, trimesters and tetraesters of acrylic acid. The pregroove layer is formed, for example, by first applying a mixed solution comprising the above-mentioned acrylic acid ester and photopolymerization initiator onto a mother die (stamper) precisely manufactured, further placing a substrate on the coating solution layer, thereafter irradiating the coating solution with ultraviolet rays through the substrate or the mother die, thereby hardening the coating layer to securely adhere the substrate to the coating layer, and then separating the substrate from the mother die. Also when the pregroove layer is provided, the grooves according to the invention can be formed by using the stamper (die) previously processed so as to have a specified shape as described above. The thickness of the pregroove layer is generally within the range of 0.05 $\mu$m to 100 $\mu$m, and preferably within the range of 0.1 $\mu$m to 50 $\mu$m.

The substrate is provided with the recording layer as described above. The recording layer can be formed, for example, by dispersing the ultrafine metal particles in a solvent to prepare a coating solution, and applying the coating solution onto a surface of the substrate to form a coating film, followed by drying. In preparing the coating solution, the binder is preferably used as described above.

Examples of the solvents used in the coating solutions for forming the recording layers include esters such as butyl acetate and cellosolve acetate; ketones such as methyl ethyl ketone, cyclohexanone and methyl isobutyl ketone, chlorinated hydrocarbons such as dichloromethane, 1,2-dichloroethane and chloroform; amides such as dimethylformamide; hydrocarbons such as cyclohexane, heptane, octane and isooctane; ethers such as tetrahydrofuran, ethyl ether and dioxane; alcohols such as ethanol, n-propanol, isopropanol, n-butanol and diacetone alcohol; fluorine surfactants such as 2,2,3,3-tetrafluoropropanol; and glycol ethers such as ethylene glycol monomethyl ether, ethylene glycol monoethyl ether and propylene glycol monomethyl ether. The above-mentioned solvents can be used alone or as a combination of two or more of them, considering the dispersibility of compounds to be used. The coating solutions may further contain various additives such as antioxidants, UV absorbers, plasticizers, surfactants and lubricants, depending on their purpose.

Coating methods include spraying, spin coating, dipping, roll coating, blade coating, doctor roll coating and screen printing. The recording layer of the invention is preferably formed by use of the spin coating. The recording layer may be either a monolayer or composed of multiple layers. The recording layer of the optical disk of the invention has a thickness in the groove portions of from 5 nm to 200 nm (preferably from 10 nm to 120 nm, more preferably from 15 nm to 80 nm, and most preferably from 20 nm to 70 nm). The ultrafine metal particle recording layer has a thickness ranging preferably from 3 nm to 180 nm (more preferably 8 nm to 100 nm, still more preferably from 13 nm to 70 nm, and most preferably from 15 nm to 60 nm), at lands.

For improving the reflectance particularly in reproducing information, the above-mentioned recording layer may be provided with the reflective layer. Light reflective substances, materials for the reflective layer, are substances having high reflectance to laser beams. Examples thereof include metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, semi-metals and stainless steel. Of these, preferred are Cr, Ni, Pt, Cu, Ag, Au, Al and stainless steel. These substances may be used alone, as a combination of two or more of them, or as an alloy of them. Preferred are Au, Ag and alloys containing these metals. Particularly preferred are Ag and Ag-containing alloys. The reflective layer can be formed on the recording layer by vapor deposition, spattering or ion plating of the above-mentioned reflective substance. The thickness of the reflective layer is generally within the range of 10 nm to 500 nm, preferably within the range of 20 nm to 300 nm, and more preferably within the range of 30 nm to 150 nm.

The heat insulating layer of the invention is also formed by the same coating methods as with the recording layer. The heat insulating layer has a thickness ranging preferably from 50 nm to 500 nm (more preferably from 50 nm to 400 nm, still more preferably from 100 nm to 350 nm, and most preferably from 150 nm to 300 nm).

The protective layer can be formed, for example, by laminating the reflective layer and/or the substrate with a film obtained by extrusion processing of a plastic resin through an adhesive layer. The protective layer may also be formed by methods such as vacuum vapor deposition, spattering and coating. In the case of a thermoplastic resin or a thermosetting resin, the resin is dissolved in an appropriate solvent to prepare a coating solution, which is applied and dried, thereby being able to form the protective layer. In the case of a UV-curing resin, the resin is applied as it is or as a coating solution prepared by dissolving the resin in an appropriate solvent, and cured by irradiation of UV light, thereby being able to form the protective layer. These coating solutions may further contain various additives such as antistatic agents, antioxidants and UV absorbers, depending on their purpose. The thickness of the protective layer is preferably from 0.1 $\mu$m to 100 $\mu$m, more preferably from 1 $\mu$m to 50 $\mu$m, and most preferably from 2 $\mu$m to 20 $\mu$m.

For protecting the recording layer and/or the reflective layer physically and chemically, the recording layer and/or the reflective layer is preferably provided with a protective layer. A surface of the substrate on which the recording layer is not formed may be provided with this protective layer, for enhancing scratch resistance and moisture resistance. Materials used for the protective layer include, for example, inorganic substances such as SiO, $SiO_2$, $MgF_2$, $SnO_2$ and $Si_3N_4$, and organic substances such as thermoplastic resins, thermosetting resins and UV-curing resins. The protective layer is preferably formed of a resin.

According to the above-mentioned process, the recording medium can be fabricated in which the substrate is provided with the recording layer, optionally with the heat insulating layer, the reflective layer and the protective layer. The resulting two recording media can also be laminated with each other with an adhesive so that the respective recording layers are positioned inside, thereby producing an optical recording medium having two recording layers. Further, the resulting recording medium can also be laminated with a disk-shaped protective substrate having a size approximately similar to that of the substrate of the recording medium with an adhesive so that the recording layer is positioned inside, thereby producing an optical recording medium having a recording layer only on one side thereof. For adhesion, either the UV-curing resins used for forming the protective layer or synthetic adhesives may be used. Adhesive double coated tapes may also be used. The adhesive layer is generally formed to a thickness ranging from 0.1 $\mu$m to 100 $\mu$m (preferably from 5 $\mu$m to 80 $\mu$m).

It is convenient for control to indicate information recorded on the optical recording medium by using a title or a pattern. For that purpose, a surface of the optical recording medium (a surface opposite to a side which is irradiated with a laser beam for recording and replay) is required to be a surface suitable for such indication. In recent years, printing methods using ink jet printers have generally been utilized. When the surface of the optical recording medium is printed using the ink jet printer, the surface of the medium is required to be hydrophilic because ink is aqueous. However, the surface of the optical recording medium is usually hydrophobic. It becomes therefore necessary to improve the surface of the optical information recording medium to the hydrophilic surface so that the aqueous ink is easily fixed thereto. The optical recording media having such hydrophilic printing surfaces (hydrophilic surface layers) are variously proposed, for example, in JP-A-7-169700, JP-A10-162438 and so on. The optical recording medium of the invention can also be provided with the hydrophilic surface layer. When the hydrophilic resin surface layer is used, it is advantageous to constitute the surface layer as a layer in which hydrophilic organic polymer particles such as protein particles are dispersed in a UV-curing resin (binder).

The layer under the hydrophilic surface layer (such as the protective layer) is usually transparent, so that luster caused by the metal contained in the reflective layer appears on the surface layer. The printing on the hydrophilic surface layer raises the problem of an unclear printed image or failure to print in a hue of ink itself by disturbance due to the metallic luster. For solving such a problem, it is effective to shield the metallic luster. As methods for shielding the metallic luster, there are known, for example, a method of adding various white or colored, inorganic or organic pigments to the hydrophilic surface layers, and a method of additionally providing lower sides of the hydrophilic surface layers with light shielding layers in which the above-mentioned pigments are dispersed in binders such as UV-curing resins. For the optical information recording media of the invention, these methods can also be utilized.

For preventing the development of fungi, fungicides may be added to the hydrophilic surface layers as described above. There is no particular limitation on the fungicide. For example, ones described in JP-A-3-73429 or JP-A-10-162438 can be used. Typical examples of the fungicides include benzimidazole compounds. When the fungicides are used, the amount thereof used is usually within the range of 0.2 mg to 2.0 mg per gram of layer.

The method of the invention for recording and reproducing information is conducted, for example, in the following manner. A laser beam for recording such as a semiconductor laser beam is condensed through an optical system, and the optical recording medium is irradiated therewith from the substrate side thereof, while rotating the medium at a specified constant linear speed or at a specified constant angular speed. The irradiation of the laser beam allows an irradiated portion of the recording layer to absorb the beam to cause a local increase in temperature, which results in physical or chemical changes to alter the optical characteristics, thereby recording information. As the recording light, there is used a laser beam having a wavelength of 300 nm to 500 nm, which is in the vicinity of visible region. As a short-wave light source for this, a semiconductor laser having an oscillation wavelength ranging from 300 nm to 500 nm is used. Preferred examples thereof include a blue-purple semiconductor laser having an oscillation wavelength ranging from 380 nm to 420 nm, and a blue-purple SHG laser in which a near infrared laser beam of 850 nm is converted to a wavelength of 425 nm by an SHG element. Further, it is preferred that the recording light is condensed through an optical system having an NA of 0.55 to 0.95. the minimum recording pit length is usually within the range of 0.05 $\mu$m to 0.7 $\mu$m (preferably within the range of 0.1 μm to 0.6 μm, and more preferably within the range of 0.2 μm to 0.4 μm). The information recorded as described above can be reproduced by irradiating the recording medium with a semiconductor laser beam having the same wavelength as used in recording from the substrate side thereof, while rotating the medium at a specified constant linear speed or at a specified constant angular speed, and detecting reflective light thereof.

The present invention will be described in greater detail with reference to the following Examples, but the invention should not be construed as being limited thereto.

EXAMPLES 1 TO 6 AND COMPARATIVE EXAMPLE 1

1. Preparation of Ultrafine Metal Particles (1) Preparation of Ultrafine Silver Particle Dispersion To 300 ml of $AgNO_3$ (0.5%), 204 ml of toluene in which 22.3 g of tetraoctylammonium bromide was dissolved was added, and mixed by stirring. To the resulting solution, 2 ml of dodecanethiol was added, and 250 ml of $NaBH_4$ (2%) was added with vigorous stirring at room temperature to reduce the silver salt. After one hour, the stirring was stopped, and the reaction solution was concentrated to 50 ml. Then, 200 ml of ethanol was added to the concentrated solution to precipitate ultrafine silver particles, and a supernatant solution was removed. To the precipitate, 200 ml of ethanol was further added, followed by mild stirring to allow precipitation. After removal of a supernatant solution, 50 ml of octane was added to the precipitate, which was dissolved by stirring. The resulting solution was filtered through a 50-nm filter to prepare a coating solution.

(2) Preparation of Ultrafine Palladium Particle Dispersion

A solution of 20 g of aerosol TO and 2 ml of dodecanethiol in 400 ml of isooctane was added to a solution of 63 ml of $Na_2[PdCl_4].3H_2O$ (10%) in 300 ml of $H_2O$, followed by stirring for 15 minutes or more to form reversed micelles (A). A solution of 20 g of aerosol OT in 200 ml of isooctane was added to a solution of 200 ml of $NaBH_4$ (3%) in 200 ml of $H_2O$, followed by stirring for 5 minutes or more to form reversed micelles (B). Solution (B) was added to solution (A) with vigorous stirring. After 10 minutes, 200 ml of isooctane was added, followed by further stirring for 10 minutes. After the termination of stirring, the resulting solution was allowed to stand for separation, and an isooctane phase, an upper phase, was collected. For removing aerosol TO from the isooctane phase collected, $H_2O$ was added and mixed therewith to remove aerosol OT by washing while transferring aerosol OT to an aqueous phase. Washing was continued until the aqueous phase becomes transparent. The resulting isooctane dispersion was concentrated to 100 ml. Then, 500 ml of methanol was added to precipitate ultrafine palladium particles, and a supernatant solution was removed. The palladium particles were further washed twice with methanol, and dried to remove methanol. Then, 100 ml of heptane was added to disperse the palladium particles, and the resulting dispersion was filtered through a 50-nm filter to prepare a coating solution.

(3) Preparation of Ultrafine Platinum Particle Dispersion

A solution of 20 g of aerosol TO and 2 ml of dodecanethiol in 400 ml of heptane was added to a solution of 42 ml of $K_2[PtCl_4]$ (10%) in 300 ml of $H_2O$, followed by stirring for 15 minutes or more to form reversed micelles (A). A solution of 20 g of aerosol TO in 200 ml of heptane was added to 200 ml of $NaBH_4$ (3%), followed by stirring for 5 minutes or more to form reversed micelles (B). Solution (B) was added to solution (A) with vigorous stirring, followed by stirring for 20 minutes. After the termination of stirring, the resulting solution was allowed to stand for separation, and a heptane phase, an upper phase, was collected. For removing aerosol TO from the heptane phase collected, $H_2O$ was added and mixed therewith to remove aerosol TO by washing while transferring aerosol TO to an aqueous phase. Washing was continued until the aqueous phase becomes transparent. The resulting heptane dispersion was concentrated to 100 ml. Then, 500 ml of methanol was added to precipitate ultrafine platinum particles, and a supernatant solution was removed. The platinum particles were further washed twice with methanol, and dried to remove methanol. Then, 100 ml of heptane was added to disperse the platinum particles, and the resulting dispersion was filtered through a 50-nm filter to prepare a coating solution.

(4) Preparation of Ultrafine Particle Dispersion of Alloy of Silver and Palladium A solution of 20 g of aerosol TO and 2 ml of dodecanethiol in 200 ml of isooctane was added to a solution of 25 ml of $AgNO_3$ (10%) in 150 ml of $H_2O$, followed by stirring for 15 minutes or more to form reversed micelles (A). A solution of 20 g of aerosol OT and 2 ml of dodecanethiol in 200 ml of isooctane was added to a solution of 13 ml of $Na_2[PdCl_4].3H_2O$ (10%) in 150 ml of $H_2O$, followed by stirring for 15 minutes or more to form reversed micelles (B). A solution of 10 g of aerosol OT in 200 ml of isooctane was added to 200 ml of $NaBH_4$ (3%), followed by stirring for 5 minutes or more to form reversed micelles (C). Solution (B) was added to solution (A) with vigorous stirring, and after 3 minutes, solution (C) was further added thereto, followed by stirring for 20 minutes. After the termination of stirring, the resulting solution was allowed to stand for separation, and an isooctane phase, an upper phase, was collected. For removing aerosol TO from the isooctane phase collected, $H_2O$ was added and mixed therewith to remove aerosol OT by washing while transferring aerosol OT to an aqueous phase. Washing was continued until the aqueous phase becomes transparent. The resulting isooctane dispersion was concentrated to 100 ml. Then, 500 ml of methanol was added to precipitate ultrafine alloy particles, and a supernatant solution was removed. The alloy particles were further washed twice with methanol, and dried to remove methanol. Then, 100 ml of heptane was added to disperse the alloy particles, and the resulting dispersion was filtered through a 50-nm filter to prepare a coating solution.

(5) Preparation of Ultrafine Silver/Palladium Inner Shell/Outer Shell Particle Dispersion A solution of 20 g of aerosol OT and 2 ml of dodecanethiol in 200 ml of isooctane was added to a solution of 25 ml of $AgNO_3$ (10%) in 150 ml of $H_2O$, followed by stirring for 15 minutes or more to form reversed micelles (A). A solution of 10 g of aerosol OT in 200 ml of isooctane was added to 200 ml of $NaBH_4$ (3%), followed by stirring for 5 minutes or more to form reversed micelles (B). A solution of 20 g of aerosol OT and 2 ml of dodecanethiol in 200 ml of isooctane to a solution of 13 ml of $Na_2[PdCl_4].3H_2O$ (10%) in 150 ml of $H_2O$, followed by stirring for 15 minutes or more to form reversed micelles (C). Solution (B) was added to solution (A) with vigorous stirring, and after 1 minute, solution (C) was further added thereto, followed by stirring for 20 minutes. After the termination of stirring, the resulting solution was allowed to stand for separation, and an isooctane phase, an upper phase, was collected. For removing aerosol TO from the isooctane phase collected, $H_2O$ was added and mixed therewith to remove aerosol TO by washing while transferring aerosol TO to an aqueous phase. Washing was continued until the aqueous phase becomes transparent. The resulting isooctane dispersion was concentrated to 100 ml. Then, 500 ml of methanol was added to precipitate ultrafine inner shell/outer shell particles, and a supernatant solution was removed. The particles were further washed twice with methanol, and dried to remove methanol. Then, 100 ml of heptane was added to disperse the particles, and the resulting dispersion was filtered through a 50-nm filter to prepare a coating solution.

(5) Preparation of Ultrafine Silver/Platinum Inner Shell/Outer Shell Particle Dispersion A solution of 20 g of aerosol TO and 2 ml of dodecanethiol in 200 ml of heptane was added to a solution of 16 ml of $AgNO_3$ (10%) in 150 ml of $H_2O$, followed by stirring for 15 minutes or more to form reversed micelles (A). A solution of 10 g of aerosol TO in 200 ml of heptane was added to 200 ml of $NaBH_4$ (3%), followed by stirring for 5 minutes or more to form reversed micelles (B). A solution of 20 g of aerosol TO and 2 ml of dodecanethiol in 200 ml of heptane to a solution of 21 ml of $K_2[PtCl_4]$ (10%) in 150 ml of $H_2O$, followed by stirring for 15 minutes or more to form reversed micelles (C). Solution (B) was added to solution (A) with vigorous stirring, and after 1 minute, solution (C) was further added thereto, followed by stirring for 20 minutes. After the termination of stirring, the resulting solution was allowed to stand for separation, and an isooctane phase, an upper phase, was collected. For removing aerosol TO from the isooctane phase collected, $H_2O$ was added and mixed therewith to remove aerosol TO by washing while transferring aerosol TO to an aqueous phase. Washing was continued until the aqueous phase becomes transparent. The resulting heptane dispersion was concentrated to 100 ml. Then, 500 ml of methanol was added to precipitate ultrafine inner shell/outer shell particles, and a supernatant solution was removed. The particles were further washed twice with methanol, and dried to remove methanol. Then, 100 ml of heptane was added to disperse the particles, and the resulting dispersion was filtered through a 50-nm filter to prepare a coating solution.

2. Preparation of Disk-Shaped Substrate

Using an injection molding machine with a built-in stamper manufactured so as to give a specified track pitch and a specified groove (pregroove) shape, a disk-shaped resin substrate (120 mm in diameter and 0.6 mm in thickness) made of a polycarbonate (trade name: Panlite AD5503, manufactured by Teijin Ltd.) was prepared. The grooves of the resulting resin substrate had a track pitch of 0.5 μm, a depth of 50 nm and a width of 200 nm, and the sidewalls of the grooves had a tilt angle of 60 degrees. These dimensions and the angle were measured using an AFM.

3. Application of Ultrafine Metal Particle Dispersion

Figure 2:
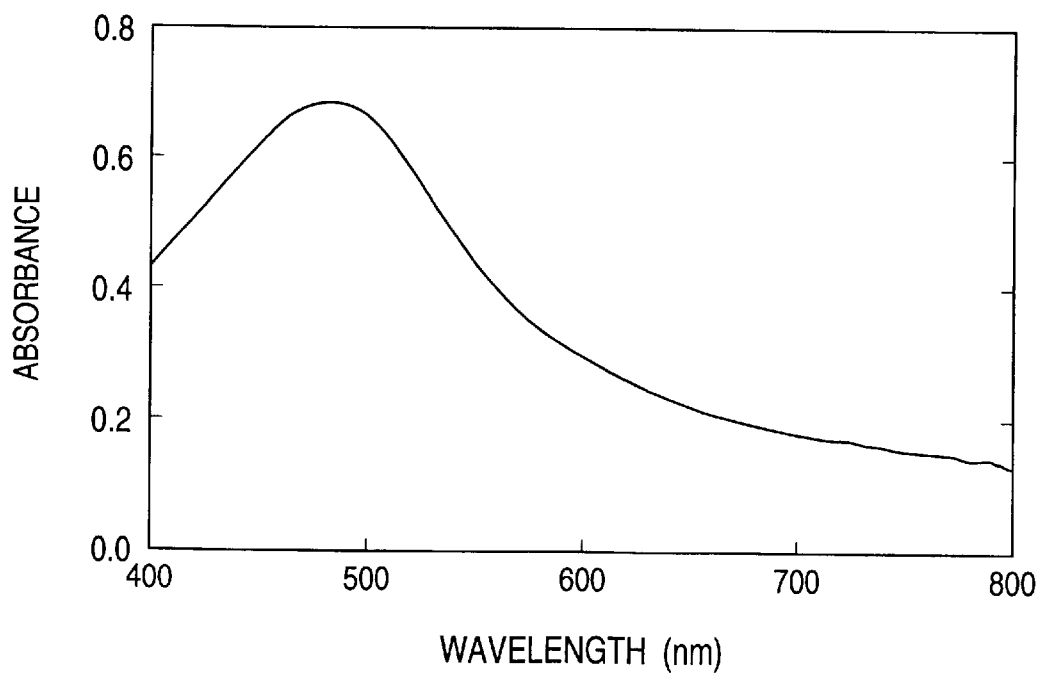
FIG. 2 shows an absorption spectrum of a coating film of ultrafine silver particles obtained in Example 1 of the invention.

The coating solution prepared by the method of (1) was applied by spin coating onto a surface of the disk-shaped polycarbonate substrate obtained above, on which the pre-grooves were formed, and dried to form a recording layer (thickness in grooves: 50 nm, thickness at lands: 30 nm). An absorption spectrum of the monolayer recording layer thus obtained is shown in FIG. 2, which shows that the layer has a high absorbance at 500 nm or less.

4. Preparation of Heat Insulating Layer

A 1.8-wt % solution of an amorphous fluororesin (trade name: Cytop, manufactured by Asahi Glass Co., Ltd.) was applied onto the recording layer by spin coating, and dried to form a heat insulating layer having a thickness of about 270 nm.

5. Preparation of Reflective layer and Protective Layer

Ag was spattered on the substrate on which the recording layer and the heat insulating layer were formed using a DC magnetron spattering apparatus (atmosphere in chamber: argon gas, pressure: 0.5 Pa) to form an about 70-nm thick heat insulating layer comprising Ag. Further, a UV-curing resin (trade name: SD318, manufactured by Dainippon Ink & Chemicals, Inc.) was applied onto the reflective layer by spin coating while changing the number of revolutions from 300 rpm to 4000 rpm. After the coating, the coated resin was irradiated from the upside thereof with ultraviolet rays from a high pressure mercury lamp to cure the resin, thereby forming a protective layer having a thickness of 8 μm. A surface of the protective layer had a hardness of 2 H. Thus, a recording medium of Example 1 was obtained in which the recording layer, the heat insulating layer, the reflective layer and the protective layer were provided in this order on the substrate.

6. Preparation of Optical Recording Media of Examples 2 to 6

Optical recording media (Examples 2 to 6) were each prepared in the same manner as with Example 1 with the exception that ultrafine metal particle coating solution (1) was substituted by ultrafine metal particle coating solutions (2) to (6), respectively, in this order.

7. Comparative Example 1

An optical recording medium for comparison (Comparative Example 1) was prepared in the same manner as with Example 1 except that a recording layer over which Ag was vapor-deposited by spattering was used in place of the recording layer of the invention of Example 1.

8. Evaluation

For the resulting optical recording media, the following evaluation was carried out. A 8/16 modulating signal was recorded on each optical medium using DDU1000 (manufactured by Pulsteck), with a laser beam having a wavelength of 405 nm using a pickup having an NA of 0.65, at a constant linear speed of 4.5 m/second at an optimum recording power, changing the recording power from 2 mW to 10 mW. Then, the recorded signal was reproduced at a constant linear speed of 4.5 m/second at a laser power of 0.5 mW to measure the modulation degree. The modulation degree was determined as the ratio of a signal amplitude of a reproduced signal to a reproduced signal output of an unrecorded portion.

9. Results

Examples 1, 2, 3, 4, 5 and 6 provided modulation degrees of 50%, 45%, 52%, 44%, 48% and 49%, respectively. On the other hand, in Comparative Example 1, the signal could not be recorded, and no recording wave form was obtained.

EXAMPLES 7 TO 9

Optical recording media was prepared in the same manner as with Example 2 with the exception that the recording layer contained 10 parts by weight of poly(dimethylsilicone) (Example 7), 20 parts by weight of poly(dimethylsilicone) (Example 8) and 10 parts by weight of poly(butadiene) (Example 9), respectively, based on 100 parts by weight of ultrafine palladium particles. As a result of evaluation, the optical recording media (Examples 7 to 9) provided modulation degrees of 55%, 51% and 50%, respectively.

EXAMPLES 10 AND 11

An optical recording medium (Example 10) was prepared in the same manner as with Example 6 with the exception that 100 parts by weight of pentamethine cyanine dye was added to the recording layer as an organic dye, based on 100 parts by weight of ultrafine silver-platinum particles, and an optical recording medium (Example 11) was prepared in the same manner as with Example 6 with the exception that 200 parts by weight of pentamethine cyanine dye was added to the heat insulating layer as an organic dye, based on 100 parts by weight of amorphous fluororesin. As a result of evaluation, the optical recording media (Examples 10 and 11) provided modulation degrees of 59% and 57%, respectively.

According to the invention, there can be provided write once-type optical recording media for short-wave laser beams with a wavelength of 500 nm or less, which are high in density and sensitivity, excellent in record keeping quality, and low in cost, and have been difficult to be realized by the conventional methods.

While the invention has been described in detail and with reference to specific examples thereof, it will be apparent to one skilled in the art that various changes and modifications can be made therein without departing from the spirit and scope thereof.

What is claimed is:

1. An optical recording medium comprising a recording layer containing ultrafine particles of a metal selected from the Group 8 and Group 1B elements, said particles having an average particle size of 1 nm to 50 nm, and surfaces thereof being modified with an adsorptive compound.

2. The optical recording medium according to claim 1, wherein said adsorptive compound is a compound having an —SH group, a —CN group or an —NH$_2$ group.

3. The optical recording medium according to claim 1, wherein said metal is a platinum group element or an alloy thereof.

4. The optical recording medium according to claim 1, wherein each of said ultrafine particles comprises an inner shell and at least one outer shell.

5. The optical recording medium according to claim 4, wherein a metal of said outer shell has a nobler potential than a metal of said inner shell.

6. The optical recording medium according to claim 4, wherein said inner shell comprises silver or a silver-containing alloy, and said outer shell comprises a metal having a nobler potential than silver or the alloy containing the metal.

7. The optical recording medium according to claim 1, wherein said ultrafine particles have a monodisperse particle size distribution.

8. The optical recording medium according to claim 1, wherein said recording layer contains a binder.

9. The optical recording medium according to claim 8, wherein said recording layer contains a silicone rubber or a polybutadiene rubber.

10. The optical recording medium according to claim 1, wherein the recording layer is formed by applying a colloidal dispersion of said ultrafine particles in a hydrophilic or hydrophobic solvent.

11. The optical recording medium according to claim 1, wherein said recording layer has a thickness of 3 nm to 180 nm.

12. The optical recording medium according to claim 1, further comprising a substrate, a reflective layer and a protective layer, wherein the recording layer, the reflective layer and the protective layer are provided on the substrate in this order.

13. The optical recording medium according to claim 1, further comprising a substrate, a heat insulating layer, a reflective layer and a protective layer, wherein the recording layer, the heat insulating layer, the reflective layer and the protective layer are provided on the substrate in this order.

14. The optical recording medium according to claim 13, wherein said heat insulating layer comprises an amorphous fluororesin.

15. The optical recording medium according to claim 1, wherein said recording layer or said heat insulating layer contains an organic dye.

16. An optical recording method which comprises carrying out recording on an optical recording medium according to claim 1 using a laser having an oscillating wavelength ranging from 300 nm to 500 nm.

* * * * *